(12) United States Patent
Rajaratnam

(10) Patent No.: US 11,857,079 B2
(45) Date of Patent: Jan. 2, 2024

(54) INTERNAL SUPPORT SYSTEM FOR CUSHIONS, MATTRESSES AND THE LIKE

(71) Applicant: Kumar Rajaratnam, Ewingsdale (AU)

(72) Inventor: Kumar Rajaratnam, Ewingsdale (AU)

(73) Assignee: Kumar Rajaratnam, Ewingsdale (AU)

( * ) Notice: Subject to any disclaimer, the term of this patent is extended or adjusted under 35 U.S.C. 154(b) by 339 days.

(21) Appl. No.: 17/274,987

(22) PCT Filed: Jun. 27, 2019

(86) PCT No.: PCT/AU2019/050674
§ 371 (c)(1),
(2) Date: Mar. 10, 2021

(87) PCT Pub. No.: WO2020/051625
PCT Pub. Date: Mar. 19, 2020

(65) Prior Publication Data
US 2022/0053944 A1    Feb. 24, 2022

(30) Foreign Application Priority Data
Sep. 12, 2018   (AU) ................. 2018903422

(51) Int. Cl.
*A47C 27/16*   (2006.01)
*A47C 27/14*   (2006.01)

(52) U.S. Cl.
CPC ............ *A47C 27/16* (2013.01); *A47C 27/148* (2013.01)

(58) Field of Classification Search
CPC ....... A47C 27/16; A47C 27/148; A47C 27/18; A47C 27/15; A47C 7/029; B60N 2/0284; A61G 5/1045; A61G 5/1091
See application file for complete search history.

(56) References Cited

U.S. PATENT DOCUMENTS 5,390,384 A  *  2/1995  Dinsmoor, III ........ A47C 7/021
                                                       5/654
5,442,823 A  *  8/1995  Siekman ................ A47C 7/029
                                                       5/653
(Continued)

FOREIGN PATENT DOCUMENTS

JP    H1080928 A    3/1998
JP    2002085206 A  3/2002
(Continued)

OTHER PUBLICATIONS

Notification of Transmittal of the International Search Report and the Written Opinion of the Internatinal Search Authority from corresponding PCT/AU/2019/050674 dated Sep. 17, 2019.

*Primary Examiner* — Justin C Mikowski
*Assistant Examiner* — Alison N Labarge
(74) *Attorney, Agent, or Firm* — Lando & Anastasi, LLP

(57) ABSTRACT

An internal support system for a cushion, mattress or the like, for supporting the body of a user, the internal support system including: a main portion having a body facing side that substantially opposes a base side; and a support portion located at least partly within the main portion, the support portion including a core portion and at least one peripheral portion which extends laterally from the core portion, wherein the height of the core portion is greater than the height of the at least one peripheral portion, the height being that as determined in the direction from the base side to the body facing side of the main portion, wherein the support portion is more resistant to deformation than the main portion.

8 Claims, 11 Drawing Sheets

(56) References Cited

U.S. PATENT DOCUMENTS

| | | | | |
|---|---|---|---|---|
| 5,522,106 | A | * | 6/1996 | Harrison ................ A47C 7/029 5/653 |
| 5,544,942 | A | * | 8/1996 | Vu Khac ................. B60N 2/70 297/452.37 |
| 6,241,320 | B1 | * | 6/2001 | Chew ..................... A47C 7/021 297/452.41 |
| 8,602,494 | B2 | * | 12/2013 | Cvek ....................... A47C 1/03 297/301.1 |
| 2005/0066445 | A1 | * | 3/2005 | Christofferson ....... A47C 7/021 5/654 |
| 2006/0170274 | A1 | * | 8/2006 | Moule ................... B60N 2/643 297/452.32 |
| 2008/0086818 | A1 | * | 4/2008 | Sramek .................. A47G 9/10 5/636 |
| 2009/0160236 | A1 | | 6/2009 | Tsuber et al. |

FOREIGN PATENT DOCUMENTS

| | | | | |
|---|---|---|---|---|
| WO | 2011075771 | A1 | | 6/2011 |
| WO | WO-2011075771 | A1 | * | 6/2011 ........... A47C 27/148 |
| WO | 2016077860 | A1 | | 5/2016 |

* cited by examiner 12-12 Section
1:1

14-14 SECTION

INTERNAL SUPPORT SYSTEM FOR CUSHIONS, MATTRESSES AND THE LIKE

CROSS-REFERENCE TO RELATED APPLICATIONS

This application is a U.S. National Phase Application under 35 U.S.C. § 371 of International Application No. PCT/AU2019/050674, filed Jun. 27, 2019, which claims priority to Australian Application No. 2018903422, filed Sep. 12, 2018. Each application referenced above is hereby incorporated by reference in its entirety for all purposes.

FIELD OF THE INVENTION

The present invention relates to an internal support system for cushions, mattresses and the like, for supporting the body of a user, as well as to cushions, mattresses and the like, incorporating same.

BACKGROUND

Internal/integral support systems for cushions, mattresses and the like, for supporting the body of a user, vary widely. For example, there are various known arrangements and constructions of seat cushions. Traditional foam cushions for seats are typically a foam cushion block which may be of one foam material. FIG. 1 is a side sectional view of a prior art foam cushion block 110. Such foam cushion seats may be sculptured with a concave upper surface 112 to provide comfort and a pleasing appearance. Other foam cushion seats may have a further sculptured upper surface that approximates a shape of the buttocks and a back of the thighs of a seat user.

FIG. 2 is the prior art foam cushion 110 of FIG. 1 being sat upon by a seat user 210. A compression to the foam cushion 110 is applied by the user's 210 buttocks 212. The buttocks 212 soft tissues include the gluteal muscles and fat about the pelvic bones 214, ischial tuberosities (sitting bones) 216, and trochanters (femur heads) 218 of the skeleton. From the skeletal anatomical features the principle compression force is applied by the ischial tuberosities 216 in the direction of the arrows 220. In addition the trochanters also apply a compression in the direction of the arrows 222. When sitting for prolonged periods and/or on a seat with inadequate cushioning, it is usually firstly about the ischial tuberosities 216 and then the trochanters 218 that discomfort may be felt. In particular the higher localised pressures applied by the protruding sitting bones 216 may provide discomfort and pain in the buttocks 212. This is particularly problematic for heavier users using thinner and/or softer cushions. In such situations the ischial tuberosities 216 are likely to "bottom out" to the harder base structure of the seat.

FIG. 3 is a side sectional schematic of a prior art foam and spring seat 310 being sat upon by a user 210. Foam and spring seats 310 are derived from prior art bedding spring. Typically the seat 310 may have a spring base 312 overlaid with a suitable cushion pad 314. A frame 316 may be used to support the spring base 312 and cushion pad 314. Bedding spring technology typically does not translate well to seats as the higher localised pressures applied by the ischial tuberosities 216 compared with a prone body upon a bed often result in the elements of the spring base 312 being felt in the buttocks 212. Bedding springs also provide localised counter pressure, even when joined together, and dissipate pressure unevenly. This results in poor pressure distribution.

FIG. 4 is a side sectional schematic of a prior art webbing based seat 410 also being sat upon by a user 210. The seat 410 may have webbing or strap lattice work base 412 suspended by and secured to a frame 316. A suitable cushion pad 314 may overlay the webbing base 412. Such seats may also be derived from prior art beds. The lack of base support directly under the buttocks 212 may result in the seat base sagging into the frame 316 and consequently the sides of the cushion pad 314 and webbing base 412 applying a sideways force into the sides of the buttocks 212 as shown by the arrows 414. Such a sideways force 414 from lack of base support can give a restrictive feeling to the seat as well as applying an uncomfortable pressure to or adjacent the trochanters 218.

A similar issue with the uncomfortable sideways force 414 to the buttocks may apply to soft and thick seat cushions which attempt to overcome the issue to bottoming out of the ischial tuberosities by providing more cushioning as softer and deeper cushions. Alternatively or in addition they may use gel pad/s across the buttocks. However these approaches may commonly result in the buttocks also sinking deeper into the softer cushion and the consequent application of the uncomfortable and restrictive sideways force 414 to the buttocks 212.

None of these prior art seating apparatus provides an entirely satisfactory solution to the provision of comfortable prolonged seating, nor to the ease of applying the seat cushion to a wide range of the seating population.

The present invention seeks to address the above mentioned disadvantages with existing seat cushions, as well as related issues with mattresses and the like, for supporting the body of a user.

SUMMARY OF THE INVENTION

In one broad form, the present invention provides a seat cushion comprising: a first cushion of a first foam material; a second cushion of a second foam material, the second cushion being substantially contained within the first cushion; a base of the second cushion substantially corresponds to a common base of the first cushion; a top surface of the second cushion underlays an upper layer of the first cushion; wherein the second cushion has a top surface with an area greater than an area of the base of the second cushion to form a peripheral region of the second cushion that overlays a lower portion of the first cushion.

In one form, a stiffness of the first foam material is less than a stiffness of the second foam material.

In one form, the peripheral region is adjacent to a seat cushion user's trochanters and the base of the second cushion is adjacent to the ischial tuberosities of the seat cushion user's.

In one form, a span across the top surface substantially corresponds to a span across a seat cushion user's trochanters. The seat cushion, wherein a span across the base of the second cushion is derived from a span across a seat cushion user's ischial tuberosities.

In one form, the trochanters are supported by: the upper layer of the first cushion, and the peripheral region of the second cushion together with the underlying lower portion of the first cushion.

In one form, the ischial tuberosities are supported by the upper layer of the first cushion and the second cushion above the base of the second cushion.

In one form, the second cushion lateral sides are contained within the first cushion.

In a further broad form, the present invention provides a seat cushion comprising: a buffer zone of a first foam material; a support zone of a second foam material; and the support zone is contained within the buffer zone with a common base; wherein a peripheral region of the support zone overlays a lower portion of the buffer zone; and wherein the second foam material is stiffer than the first foam material.

In a further broad form, the present invention provides an internal support system for a cushion, mattress or the like, for supporting the body of a user, the internal support system including: a main portion having a body facing side that substantially opposes a base side; and a support portion located at least partly within the main portion, the support portion including a core portion and at least one peripheral portion which extends laterally from the core portion, wherein the height of the core portion is greater than the height of the at least one peripheral portion, the height being that as determined in the direction from the base side to the body facing side of the main portion, wherein the support portion is more resistant to deformation than the main portion.

In one form, at least part of the core portion forms part of a base periphery of the internal support system.

In one form, the support portion is located such that part of the main portion separates the support portion and the body facing side of the main portion.

In one form, the proportion of support portion between the body facing side and the base side of the main body portion decreases from the core portion to the at least one peripheral portion such that the internal support system provides a varying support profile.

In one form, the least one peripheral portion tapers in an outward lateral direction.

In one form, the support portion includes a base surface and a top surface, the base and top surfaces being substantially parallel in the core portion, and, at least a portion of the base surface sloping toward the top surface to provide the one or more peripheral portions.

In one form, part of the main portion separates the at least one peripheral portion from the base side of the main portion.

In one form, the support portion is removably located within the main body portion. In one form, the support portion is slidingly received by the main portion.

In a further broad form, the present invention provide an internal support system for a cushion, mattress or the like, for supporting the body of a user, the internal support system including: a main portion; and a support portion located at least partly within the main portion, the support portion being more resistant to deformation than the main portion, wherein the proportions of support portion and main portion vary laterally through the internal support system to provide a varying support profile.

In a further broad form, the present invention provides a cushion including an internal support system as described in any one of the above forms.

In a further broad form, the present invention provides a mattress including an internal support system as described in any one of the above forms.

BRIEF DESCRIPTION OF THE DRAWINGS

The description is made with reference to the accompanying drawings, of which.

DETAILED DESCRIPTION

Embodiments of the invention provide an internal/integral support system that can be implemented in cushions, mattress and the like, for supporting the body of a user.

One preferred form of the invention is embodied as a seat cushion. Prior art seats such as described with respect to prior art FIGS. 1 to 4 suffer from a lack of a way to re-distribute forces more satisfactorily and comfortably across the buttocks, and reduce the forces and pressures on the ischial tuberosities (sitting bones) 216 areas of the buttocks 212. In addition, those prior art seats which may seek to re-distribute undue pressure from the ischial tuberosities by softer and deeper cushions and/gel pads often fail to provide sufficient suspension of the trochanters 218. Instead such prior art seating may provide an uncomfortable and restrictive sideways force 414 to the buttocks 212 and the trochanters 218.

Figure 1:
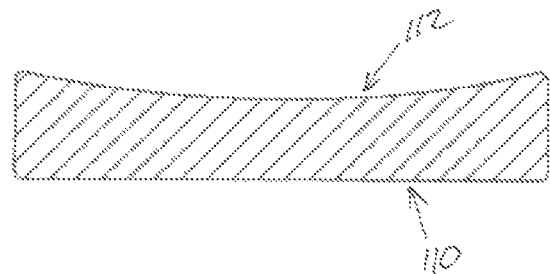
FIG. 1 is a schematic of a side sectional view of a prior art foam cushion block.
Figure 2:
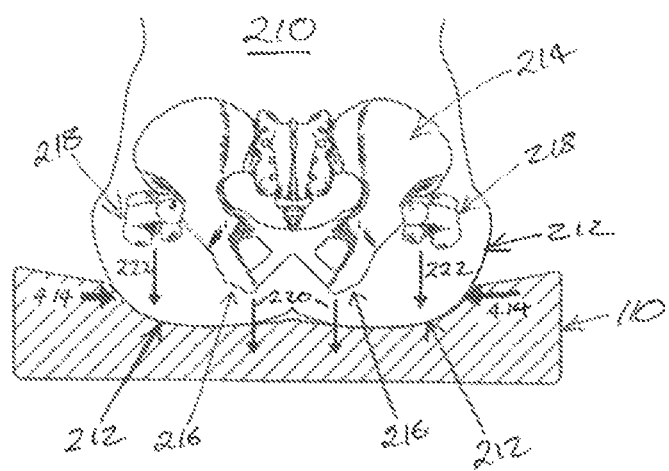
FIG. 2 is the prior art foam cushion of FIG. 1 being sat upon by a seat user.
Figure 3:
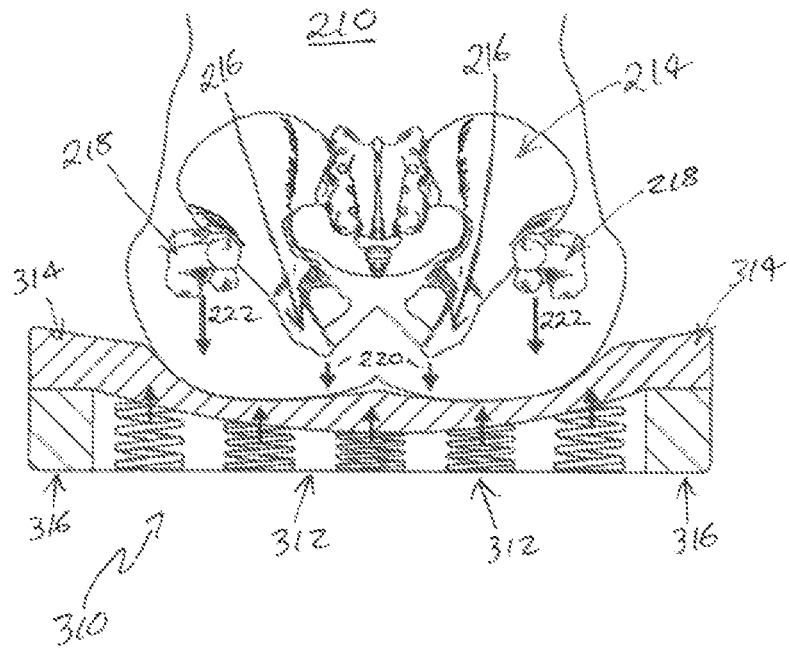
FIG. 3 is a side sectional schematic of a prior art foam and spring seat being sat upon by a user.
Figure 4:
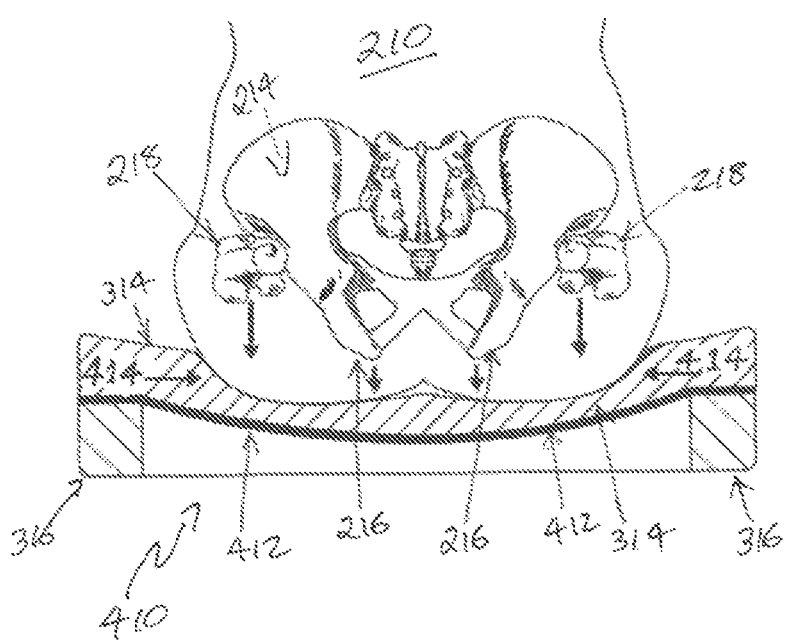
FIG. 4 is a side sectional schematic of a prior art webbing based seat, also being sat upon by a user.
Figure 5:
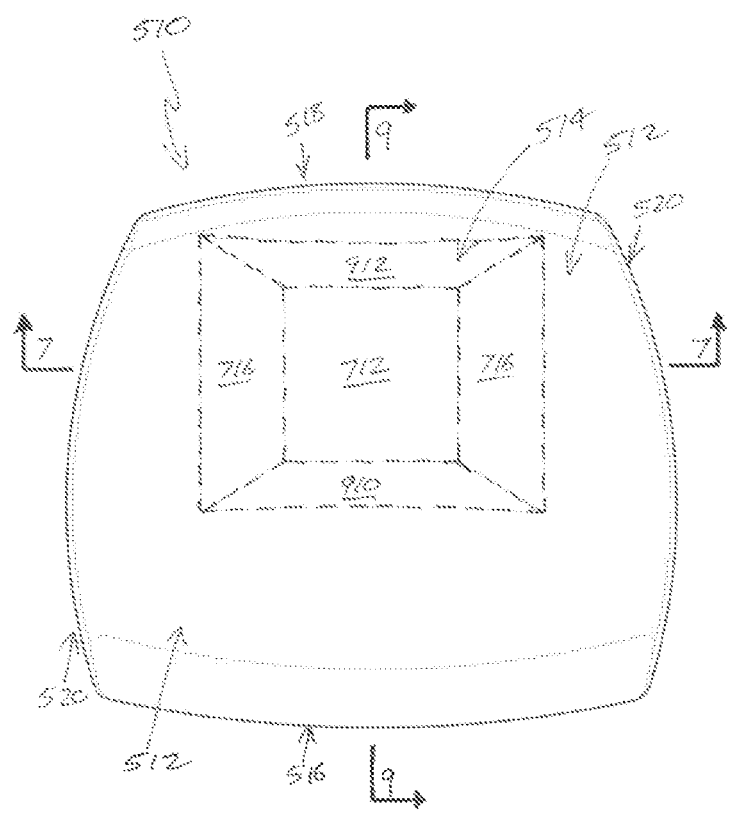
FIG. 5 is a schematic of a plan view from the top or seating surface of a seat cushion according to one example of the invention.
Figure 6:
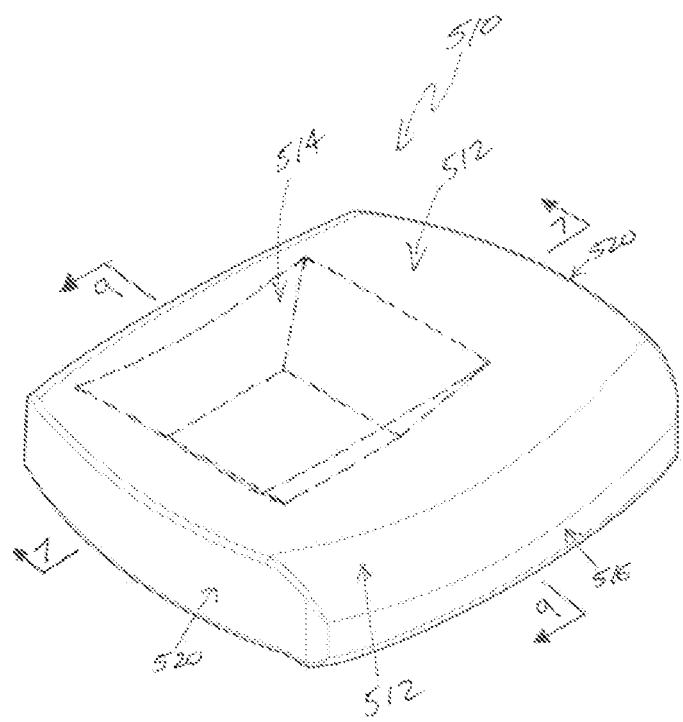
FIG. 6 is a schematic of a perspective view of the seat cushion of FIG. 5, also viewed mainly to the upper seating surface.

FIG. 5 is a plan view from the top or seating surface of a seat cushion 510 of the invention. FIG. 6 is a perspective view of the seat cushion 510 of FIG. 5, also viewed mainly to the upper seating surface. The seat cushion 510 is a composite or hybrid cushion with a first cushion 512 and a second cushion 514. The first cushion 512 forms the overall shape of the seat cushion 510 and features a front edge 516, a rear edge 518 as well as left and right sides 520. The second cushion 514 is an insert to the first cushion 512. In FIGS. 5 and 6 an outline of the second cushion insert 514 is shown by dashed lines within the first cushion 512.

Figure 7:
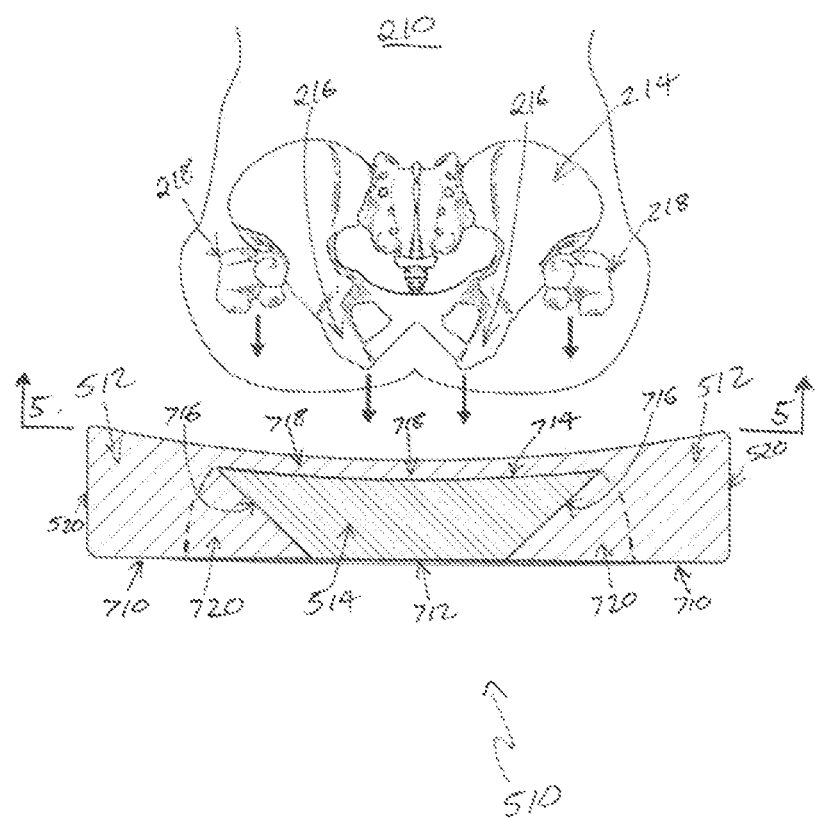
FIG. 7 is a schematic of a sectional view along the lines 7-7 in FIGS. 5 and 6.

FIG. 7 is a sectional view along the lines 7-7 in FIGS. 5 and 6. The second cushion 514 is shown contained within the first cushion 512 with a common base 710. That is a base surface 712 of the second cushion 514 is substantially on the same corresponding level as the common base 710 shown in FIG. 7. The second cushion 514 has an approximately trapezoidal cross-sectional shape with a top surface 714, a substantially parallel bottom surface 712 and sloping lateral sides 716. The top surface 714 of the second cushion underlays an upper layer 718 of the first cushion 512.

The top surface 714 area of the second cushion 514 is greater than that of the base surface 712 area so that the lateral sides 716 of the second cushion 514 overlay a lower portion 720 of the first cushion 512. The overlaid lower portion 720 of the first cushion 512 is shown generally in dashed line outline in FIG. 7. Accordingly a peripheral region of the second cushion is defined or formed by portions of the second cushion 514 above the lateral sides 716 which overlay the lower portions 720 of the first cushion 512 that are adjacent and may surround the base 712 of the second cushion. In other words, the second cushion has a top surface with an area greater than an area of the base of the second cushion to form a peripheral region of the second cushion that overlays a lower portion of the first cushion.

In FIG. 7 the trochanters or femur heads 218 are shown substantially above the peripheral region 716, 720 of the varying composite region of the first and second cushions 512, 514. The ischial tuberosities or sitting bones 216 are shown substantially above the base surface 712 of the second cushion 514. Accordingly when the user 210 sits, as described with respect to FIG. 8 below, the ischial tuberosities 216 may be supported by the full thickness of the second cushion 514 together with the upper layer 718 of the first cushion 512. Whilst the trochanters 218 are supported by the peripheral region 716, 720.

The first cushion material stiffness or hardness may be selected to be of less than a stiffness or hardness of a material selected for the second cushion. That is the first cushion material is softer than the second cushion material. The importance of the second cushion material being stiffer or harder than the first cushion material is described below with respect to FIG. 8. The first and second cushion materials may be of a suitable foam, for example a polyurethane foam may be used where the reactants of diisocynate and polyol are varied with respect to their speed of reaction in order to vary the properties of support, stiffness and recovery as desired. The composition of the second foam material for the second cushion may also be formulated by a person skilled in the art to vary the shear performance of the foam. For example to the performance of the lateral movement of the second cushion 514 into the surrounding lower portions 720 of the first cushion 512 as described below.

The foam material or "first foam material" for the first cushion may also be formulated to have a memory foam effect. Memory foam is still an elastic foam, however it has a delayed time to recover its original shape after compression. The use of memory foam is beneficial for conforming to the shape of the buttocks 212. A suitable memory foam may be formulated by a person skilled in the art. For example a selected blend of a polyurethane and gel compounds may provide the desired memory effect, stiffness, heat conductivity and/or breathability. The selection of heat conductivity and breathability for the memory foam may be important to reduce body heat build-up in the first cushion upper layer 718.

In one example for a user of approximately <75 kg weight the hardness of the second cushion or insert 514 may be approximately 32 points with an approximate range of 29 to 35 points. Where the hardness measurement is by a common industry technique of an Asker X Durometer, www.asker-.co.jp. For foam materials, the durometer has a type F flat, disc shaped measurement probe or indenter. The measurement scale is a 100 point calibrated scale suitable for measurements of materials such as urethane foam, polystyrene foam and sponges. For example 0 point is no resistance whilst 100 points is a comparatively unyielding surface for these types of foam or sponge like materials. The hardness of the first cushion 512 for a user of approximately <75 kg weight may be less at approximately 27 points with an approximate range of 24 to 28 points.

In another example for a user >75 kg the hardness or stiffness of the second cushion 514 may be approximately 36 points with a range of 33 to 39 points. For the first cushion 512 the hardness or stiffness may be less at approximately 27 points with a range of 24 to 30 points.

The desired foam stiffness or hardness for each cushion 512, 514 may also be expressed as a range of the ratios of the hardness values from an Asker Durometer measurement. The preferred ratio range for the hardness ratio of the second cushion 514 to the first cushion from the above example is approximately 1.19 to 1.33 for weights above and below 75 kg. For a weight of <75 kg the ratio may be up to approximately 1.46 whilst for a weight of >75 kg the ratio may be up to approximately 1.63.

The foam material stiffness values for the first and second cushion materials may also be selected by a person skilled in the art so that the invention performs as described below with respect to FIG. 8. For example the difference in foam stiffness values are not so great that the lateral sides 716 of the second cushion 514 in the peripheral region do not fold over, sandwich or collapse the lower portions 720 of the surrounding first cushion 512.

Figure 8:
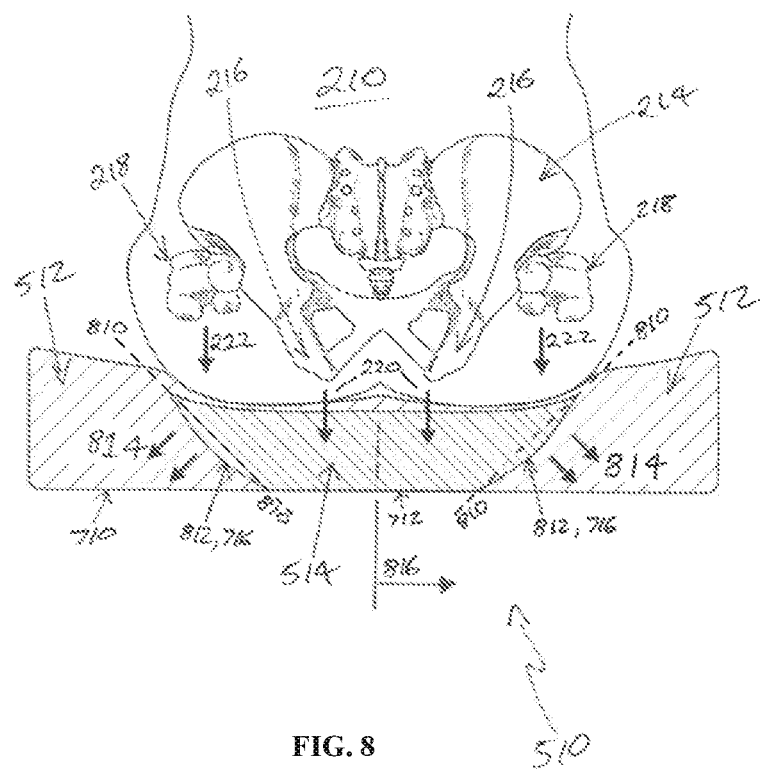
FIG. 8 is the sectional view of FIG. 7 with the user sitting on the seat cushion.

FIG. 8 is the sectional view of FIG. 7 with the user 210 sitting on the seat cushion 510. The softer upper layer 718 of the first cushion 514 is comparatively readily compressed by the user's buttocks 212, as shown for example in FIG. 8. The stiffer or harder material of the second cushion 516 provides more support for the ischial tuberosities 216 and is compressed less than the softer material of the first cushion 514. In FIG. 8 dashed lines 810 are used to show the original position of the lateral sides 716 of the second cushion 514. The lateral sides 716 have been displaced outwards 812 into the lower portion 720 of the surrounding first cushion 512. At least two beneficial effects result from this action.

The first beneficial effect is that the compression of the second cushion by the ischial tuberosities is also dependent on the stiffness of the first cushion material surrounding the second cushion. In typical practice the thickness of the second cushion and the stiffness of the second cushion material prevent the vertical bottoming out of the ischial tuberosities to the base 712 of the second cushion. The new and inventive use of the sloping, lateral sides 716 to the second cushion allow the second cushion to displace into the softer first cushion 512 laterally and downwardly as shown by the arrows 814. This displacement allows for the effective lateral stiffness of the second cushion to be less than downward stiffness used to support the ischial tuberosities and prevent bottoming out to the base 712. Accordingly the second cushion 514 to the sides at least of the ischial tuberosities is softer and more comfortable. The softer first cushion material surrounding the harder second cushion material at the sloping lateral sides 716 prevents the collapse of the sides 716 and maintains adequate support through to the common base 710 of the seat cushion 510. In other words the first cushion 512, 720 material surrounding the second cushion 514 acts to contain and support the second cushion.

The second beneficial effect results from the peripheral region's varying composite stiffness. The composite stiffness or hardness in the peripheral region is made up of the second cushion at the lateral and sloping sides 716 overlaying the lower portions 720 of the first cushion 512 adjacent and/or surrounding the second cushion 514. The composite stiffness of the peripheral region 716, 720 varies with horizontal distance outwards from a center of the second cushion as shown by a center line and arrow 816. The stiffness presented to the compressing buttocks by the seat cushion 510 varies from being dominated by the material of the second cushion at and adjacent the center 816 in order to support the ischial tuberosities. Then gradually decreasing with distance towards where the lateral sides 716 of the second cushion 514 intersect with the common base 710. Further outwards from the center 816, in the peripheral region 716, 720 the stiffness presented by the seat cushion 510 is a composite of the peripheral region 716, 720 of the second cushion 514 and the lower portions 720 of the first cushion 512. The stiffness of the peripheral region 716, 720 becoming closer to the surrounding first cushion material stiffness with increasing horizontal distance from the second cushion center 816. Beyond the peripheral region the stiffness of the seat cushion 510 is dominated by the first cushion material.

The varying or gradient of composite stiffness in the peripheral region 716, 720 allows the seat cushion to support the buttocks about the trochanters but not with a sideways force 414 applied to the buttock sides typical in the prior art. That is the sideways force 414 described above with respect to the prior art FIGS. 1 to 4 is absent or substantially reduced. In other words the trochanters can remain comfortably suspended with no or minimal sideways force to the buttocks adjacent the trochanters resulting from sinking into the seat cushion too far.

A combined beneficial effect is also obtained from: the second cushion's displacement of the lateral side 716 into the lower portion 720 of the surrounding first cushion 510 together with the varying composite stiffness of the peripheral region. Heavier users may cause the second cushion to compress more and laterally displace into the lower portions 720 of the first cushion at the lateral sides 716. With increased displacement of the lateral walls 716 into the lower portions 720 the composite stiffness may increase within the peripheral region. Accordingly for heavier users more support is supplied to the buttocks adjacent the trochanters 218 so as to provide adequate suspension of the trochanters and minimise the undesirable sideways force of the first cushion's seating surface against the side of the buttocks 212. Thus the seat cushion 510 adapts the support to a user across the ischial tuberosities to the trochanters according to the weight of the user so that the trochanters are appropriately supported and suspended without an undue sideways force applied to the buttocks adjacent the trochanters.

From the descriptions with respect to FIGS. 7 and 8 it will be readily appreciated that the lateral sides 716 of the second cushion 514 are always contained in the first cushion 512. In particular the lateral sides 716 are contained with the surrounding and/or adjacent lower portions 720 of the first cushion 512.

It will be readily appreciated that adjusting the relative and absolute values for the stiffness (or hardness) of the materials making up the first and second cushions 512, 514 may be used to improve the performance of the seat cushion to lighter and heavy users compared with the bulk of the user population. A memory foam material may also be used within the first cushion 512 to allow the seat cushion to mould further to the user with prolonged use. For example the memory foam may relax or distort further with body heat and prolonged use to provide more conformal support to the user as well as a beneficial variation in support with prolonged, continuous use. In particular the use of memory foam in the first cushion may vary the support provided to the lateral sides 716 provided by the surrounding lower portion 720 of the first cushion 512.

The invention described with respect to FIGS. 5 to 8 may also be described as having a support zone 514 corresponding to the second cushion 514. The support zone 514 is surrounded by a containment or buffer zone 512 corresponding to the first cushion 512 and in particular the lower portions 720 of the first cushion. The support zone 514 material has a higher stiffness or resistance to compression than the material used for the buffer or containment zone 512. For example a high density polyurethane foam, without any memory performance, may be selected depending on a user's weight. Higher density polyurethane foam for heavier users and lower density foam for lighter users. When the user sits upon the support zone 514 the higher stiffness or resistance of the support zone is provided through to the base 712. In addition the support zone disperses or laterally transfers the user's weight load to the adjoining containment or buffer zone 512, 720 that has a softer and less resistant material than that for the support zone. The result of this lateral transfer of weight is controlled and supported distribution of the user's weight to the containment/buffer zone to provide less resistance or stiffness about the ischial tuberosities but still preventing "bottoming out" of the ischial tuberosities to the seat cushion base 710, 712.

That is the seat cushion distributes the user's weight across two zones. The support zone 516 for the ischial tuberosities (sitting bones) and the buffer zone 512, 720 for the trochanters. This approach allows for 97% of trochanter widths and 97% of the ischial tuberosity widths for the adult population to be accommodated by a single seat cushion size. The scaling of the seat cushion 510 to the pelvic and femur skeletal anatomy is described further below with respect to FIG. 10. In addition the use of the support zone 514 with the buffer zone 512, 720 allows for greater weight ranges to be accommodated due to the composite mix of stiffness between the support zone 514 and the buffer zone 512, 720 as well as the structure and operation of the support zone with the buffer or containment zone.

It will be readily appreciated that the upper layer 718 of the first cushion to the second cushion or support zone 514 is optional for the seat cushion 510. The upper layer 718 may improve the seat cushion integrity and comfort but it is optional to the performance of the invention as described herein.

Figure 9:
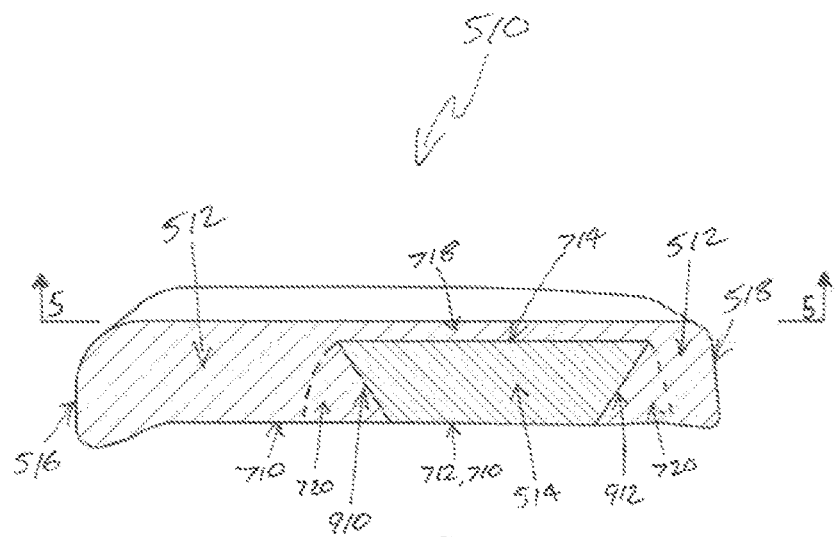
FIG. 9 is a schematic of a sectional view along the lines 9-9 in FIGS. 5 and 6.

FIG. 9 is a sectional view along the lines 9-9 in FIGS. 5 and 6. FIG. 9 is the orthogonal sectional view to FIG. 7. The sectioned second cushion 514 insert in the first cushion 512 shown in FIG. 9 is also approximately a trapezoidal cross-sectional shape with the same top surface 714 and base surface 712 as shown in FIG. 7. The cross-sectional trapezoidal shape has a sloping front side 910 and a sloping rear side 912. In FIG. 9 an angle between the sloping front and rear sides 910, 912 and the common base 710 is approximately 60°. Whilst in FIG. 7 the sloping lateral sides 716 are at an approximate angle of 45° to the common base 710. The peripheral region 716, 720 of the left and right hand lateral sides 716 of the second cushion 514 shown in FIG. 7 are to accommodate a variation in the spans between the trochanters 218 for a substantial proportion of the adult user population. Accordingly a shallower or more acute angle of 45° may be used for the lateral side peripheral region 716, 720 in order to have an appropriately wide composite stiffness region in the periphery to support and suspend the trochanters 218. For the front and rear peripheral regions 910, 912 a greater angle may be used to provide a horizontally narrower peripheral region. A narrower front peripheral region 910 may be desirable to transition more rapidly from the harder support zone second cushion 514 to the softer buffer zone first cushion for the comfort and angling down of the user's thighs. A narrower rear peripheral region 912 may be used to provide a transition to the softer first cushion 512 for the increased comfort of user's sacrum (tail bone).

It will be readily appreciated that the 60° angle for the front and rear sides 910, 912 may be varied to suit what the desired peripheral region width is required and comfortable for a seat cushion user population. The variation of the 45° angle for the lateral side 716 peripheral region is detailed further with respect to FIGS. 10 to 16.

The insert second cushion 514 and support zone which has been described herein has been to a trapezoidal cross-section with a larger rectangular top surface 714 area compared with the smaller base surface 712 area of a square shape as shown in the FIGURES. However it will be readily appreciated that to provide the peripheral region of composite stiffness in the seat cushion 510 that other shapes for the second cushion 514 may be used. For example the top and bottom surfaces may be circular so that the shape formed is a frustum with the larger flat surface being uppermost in order to form the sloping sides and peripheral region. The peripheral region would then be a peripheral annular region about the frustum. In another variation the top and bottom surfaces may be ellipsoidal. In a further variation the sloping sides to the front and rear of the second cushion may be absent, the support zone 514 and peripheral region 716, 720 only being provided for the trochanters 218.

Figure 10:
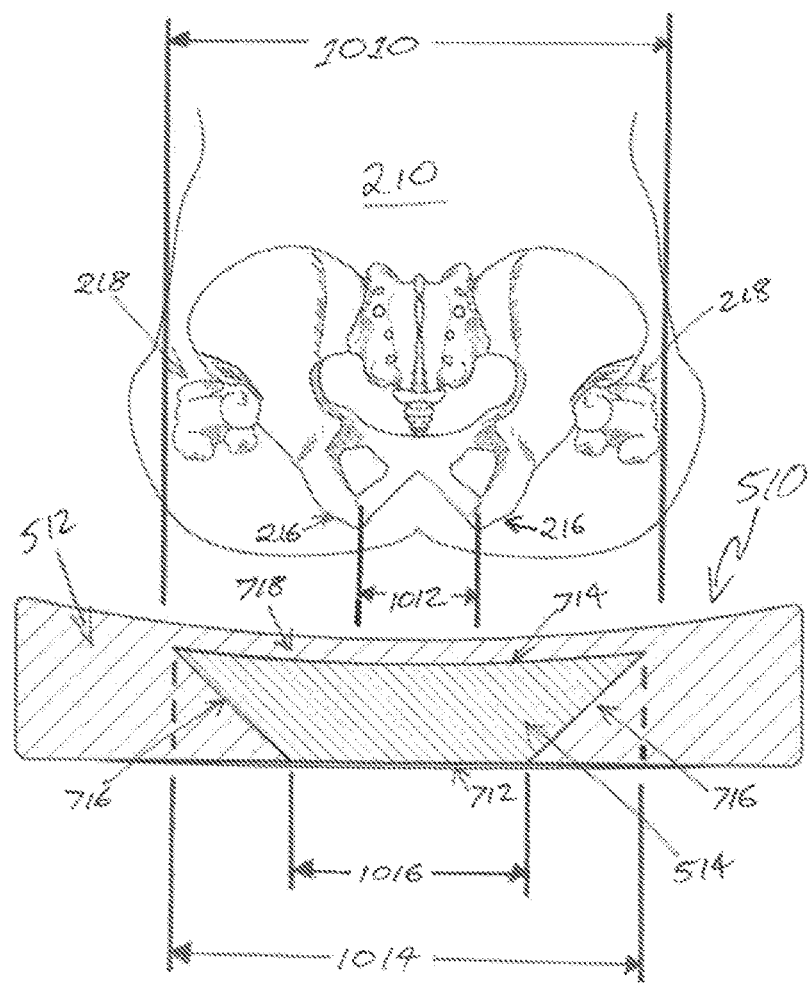
FIG. 10 is a sectional view like FIG. 7 along the lines 7-7 in FIGS. 5 and 6, showing a number of example, preferred dimensions.

FIG. 10 is a sectional view like FIG. 7 along the lines 7-7 in FIGS. 5 and 6. FIG. 10 additionally shows a number of example, preferred dimensions found by the inventor and derived from anthropometric data as described below. These preferred dimensions for the user 210 and the seat cushion 510 may be used to scale the skeletal anatomical features anthropometric values of a population of users to the features and functions of the seat cushion 510. For the users a span 1010 mm between the outer extent of the heads of the femurs or trochanters 218 has been found to be a preferred dimension. The span or width 1010 mm across the trochanters 218 may also be referred to as the skeletal width. Another preferred anthropometric measurement is a span or width 1012 mm across the sitting bones or ischial tuberosities 216. The width 1012 mm between the ischial tuberosities may be determined between the outermost projections that can easily be felt or otherwise suitably measured.

It has been found by the inventor that a 97 percentile of the trochanter width 1010 mm for an adult user population may be used to set a width 1014 mm of the top surface 714 of the second cushion 514. If the width 1014 mm of the top surface 714 is made approximately the same as the 97 percentile trochanter width 1010 mm, then the inventor has found that approximately 97% of the adult population will have their trochanters 218 adequately supported and suspended by the peripheral region 716, 720.

It has also been found by the inventor that a 97 percentile ischial tuberosities width 1012 mm may be used to derive a width 1016 mm of the base 712 of the second cushion support zone 514. If the base width 1016 is made approximately the same as: the ischial tuberosities width 1012 mm plus at least approximately 30 mm, then the inventor has also found that approximately 97% of the adult user population ischial tuberosities' 216 are supported adequately and comfortably. It will be readily appreciated that the 97 percentile adult population anthropometric values may vary with user population location. For example different 97 percentile values may be used for the different user populations in each of Europe, Northern America and Japan.

Figure 11:
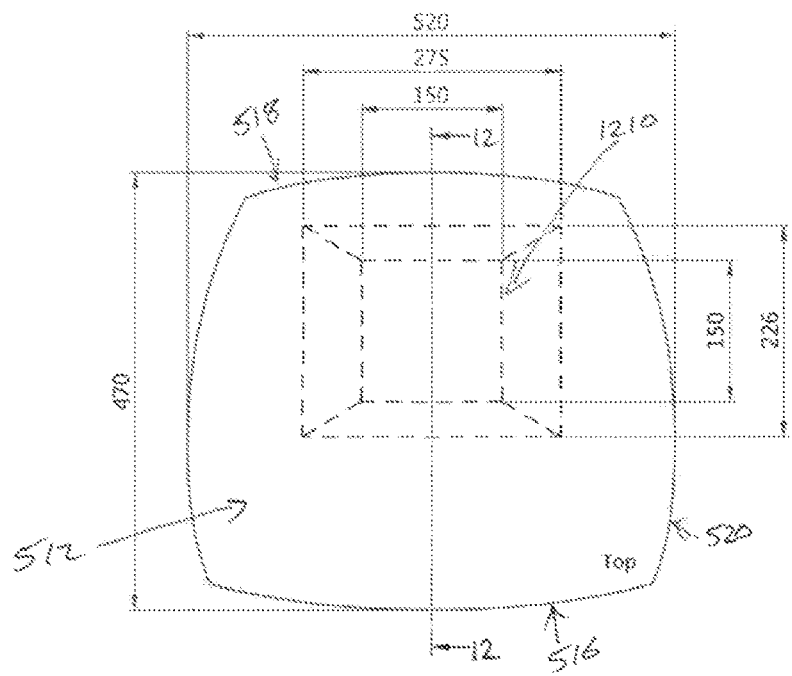
FIGS. 11 and 12 are schematics to respective plan, upper and side sectional technical drawing views of a first cushion or a containment zone of the seat cushion.
Figure 12:
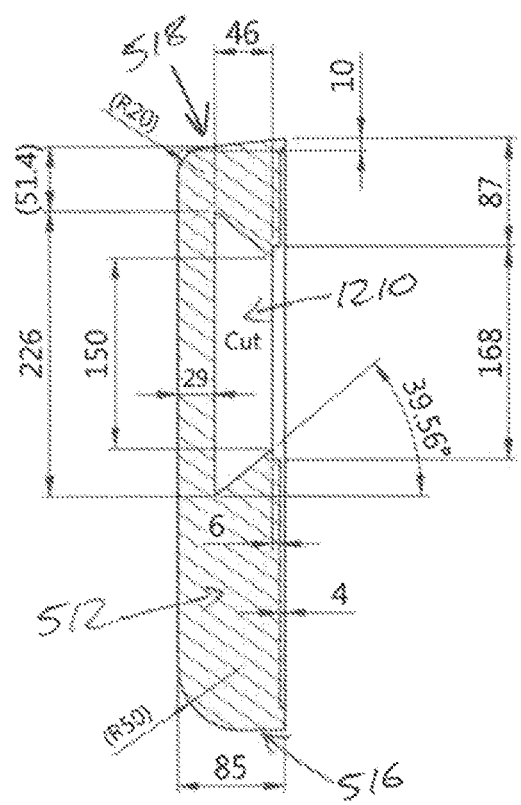

FIGS. 11 to 16 are technical drawings of various views of the first and second cushions 512, 514 of the seat cushion 510. The drawings are to a pre-production seat cushion 510. The dimensions and angles shown in FIGS. 11 to 16 are to suit a 97% percentile adult population. FIG. 11 is a plan, elevational view of the seat cushion from the seating surface. FIG. 12 is a cross-sectional view along the line 12-12 shown in FIG. 11. FIG. 12 shows the cutting 1210 made into the first cushion 512 to provide a cavity 1210 for the second cushion material. The second foam material of the second cushion material may be blow moulded into the cavity 1210 and set. During the blow moulding into the cavity 1210, the first and second cushion materials may be bonded together. The bonding may be done so as to be un-noticeable to the user whilst allowing the seat cushion 510 to perform as described herein. In FIG. 12 an alternate angle of 39.56° is shown for the front side 910 to the common base 710 angle described with respect to FIG. 9.

Figure 13:
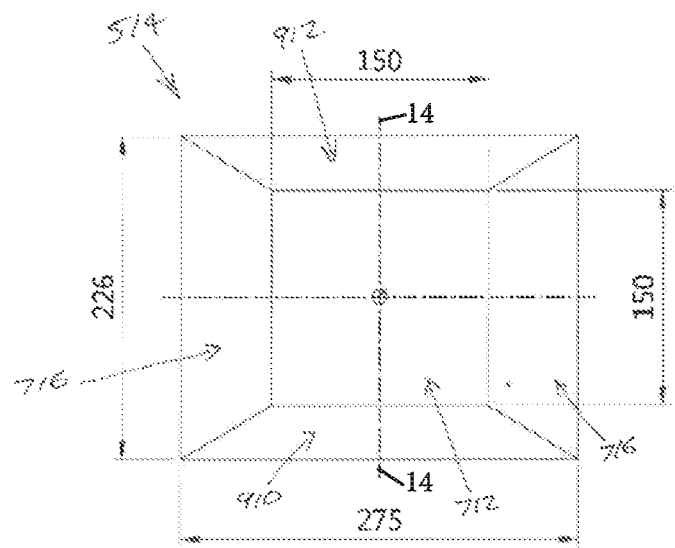
FIGS. 13 and 14 are schematics to respective base plan and side elevational technical drawing views of a second cushion insert or support zone for the first cushion of FIGS. 11 and 12.
Figure 14:
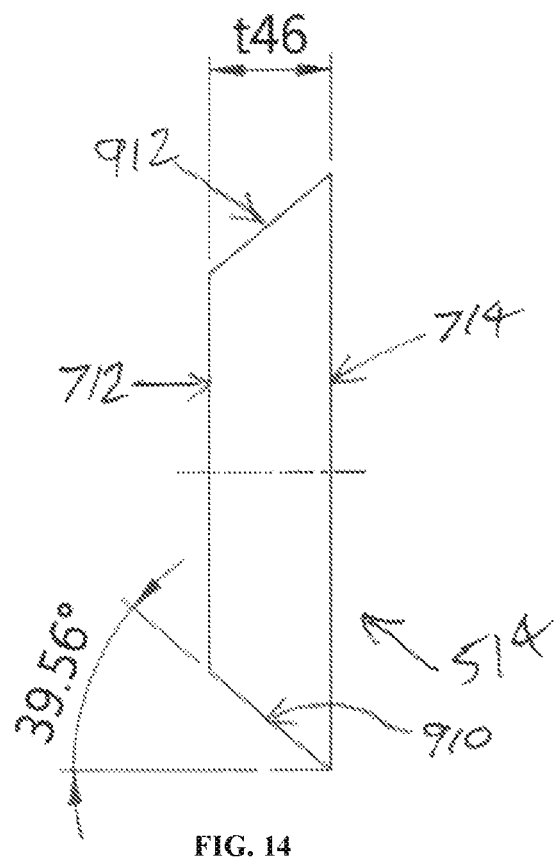

FIGS. 13 and 14 are respective base plan and side elevational views of the second cushion 514 insert corresponding to FIGS. 11 and 12. An alternate angle of approximately 36° for the lateral side 716 to the common base 710 may be derived from the drawing dimensions. This is an alternate angle to the 45° value described with respect to FIGS. 7 and 9.

Figure 15:
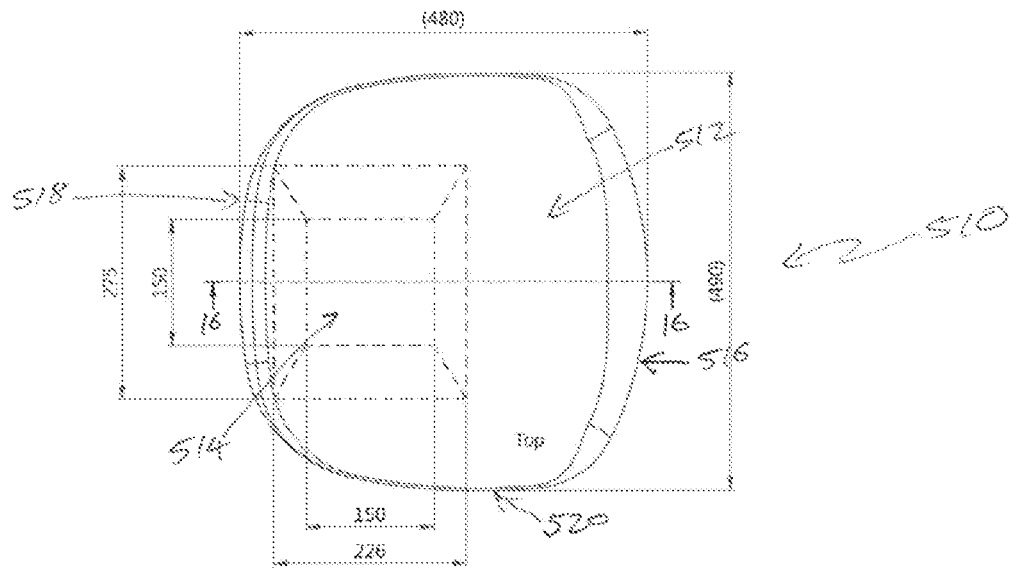
FIGS. 15 and 16 are schematics to respective plan, upper and side sectional technical drawing views of a complete seat cushion with alternative dimensions and styling to the seat cushion components shown in FIGS. 11 to 14.
Figure 16:
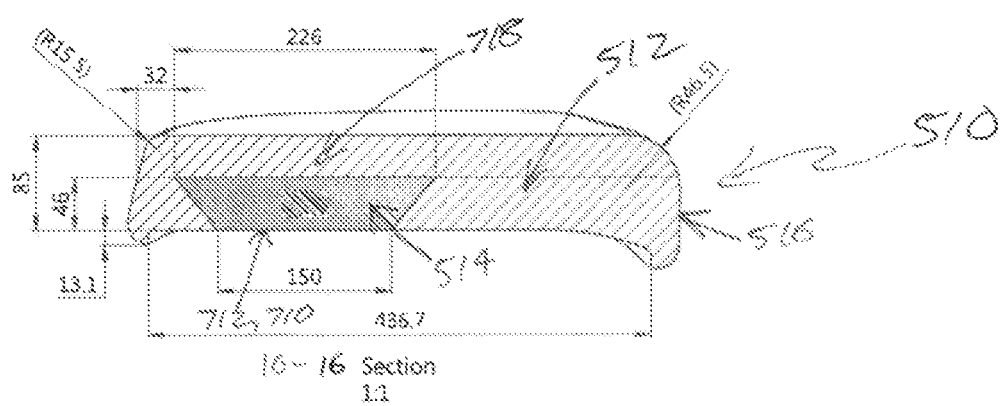

FIGS. 15 and 16 are respective plan, upper and side sectional views of a complete seat cushion 510 with some alternative dimensions and styling to the seat cushion components shown in FIGS. 11 to 14.

The seat cushion 510 described herein has a further advantage to providing support to the user with reclining angle. For example the seat cushion provides support as described herein for a reclining angle range of at least 90° to 105° for an angle defined by the user's back to the horizontal plane through the buttocks 212 and upper thighs of the user.

Figure 17:
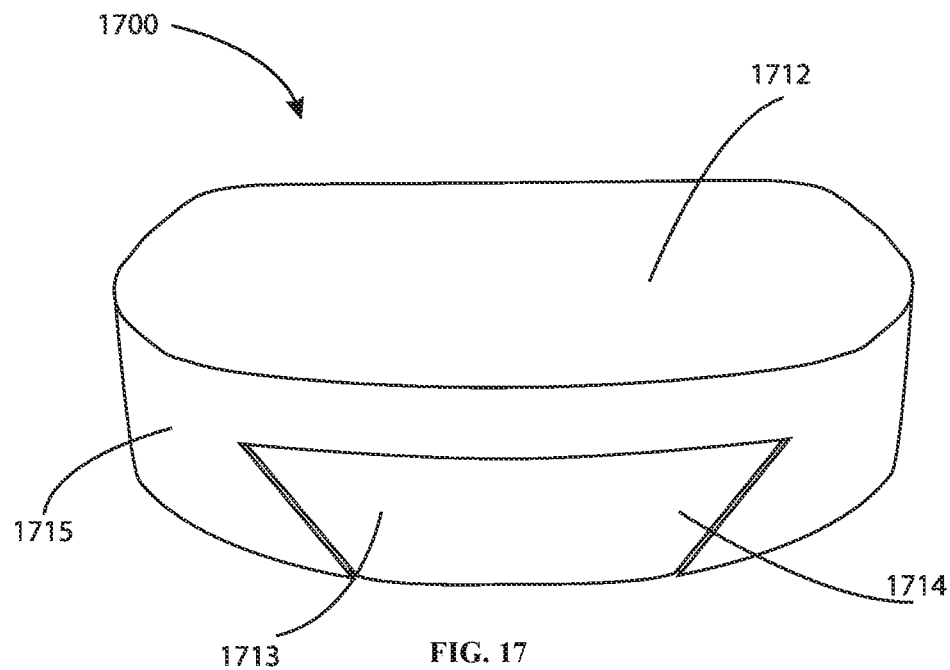
FIG. 17 is a rear perspective view of one example of seat cushion according to the invention.
Figure 18:
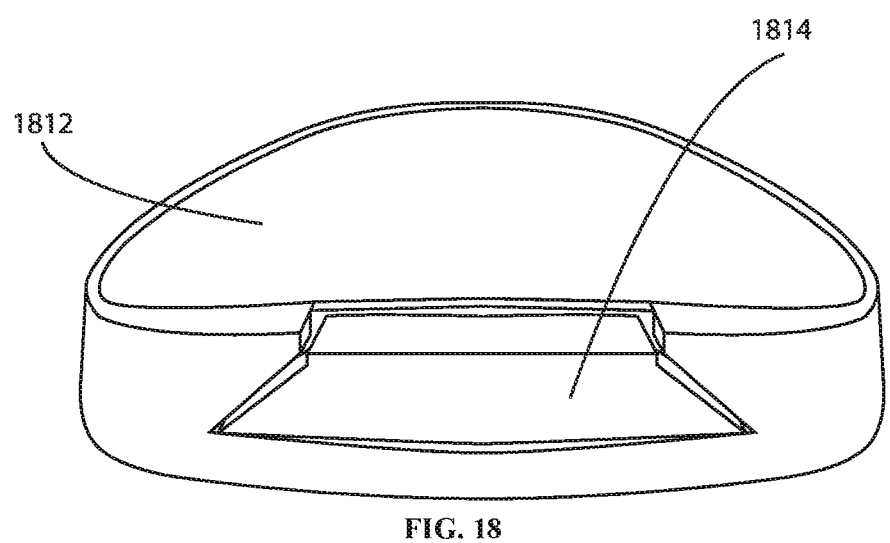
FIG. 18 is rear perspective view of a further example of a seat cushion according to the invention, in a flipped position, with base upward facing.
Figure 19:
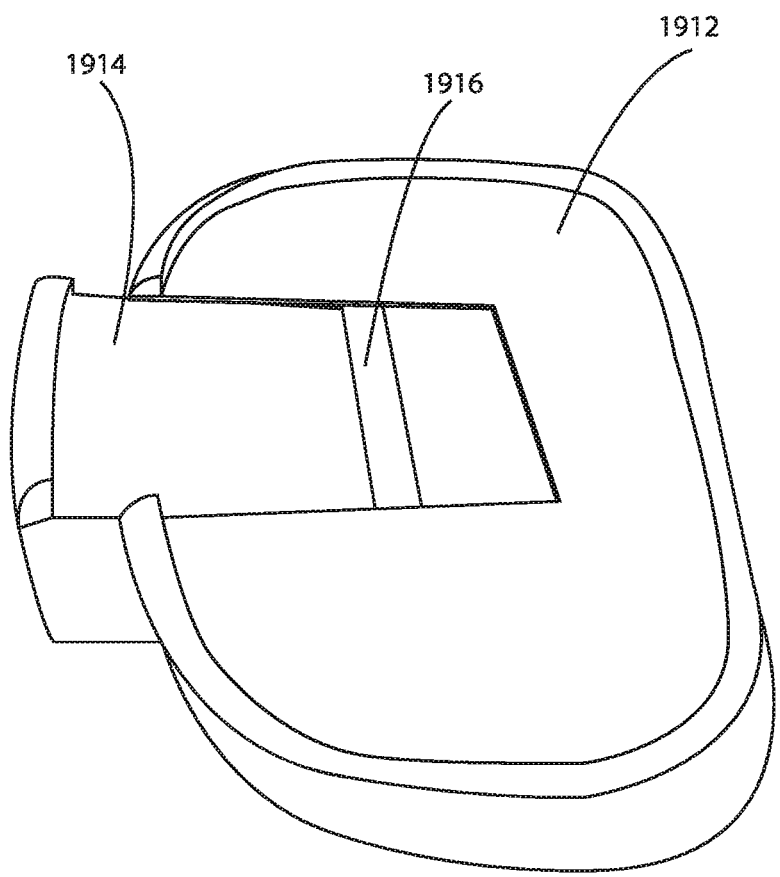
FIG. 19 is rear perspective view of a further example of a seat cushion according to the invention, in a flipped position, with base upward facing, showing insertion/removal of second cushion/support zone.

Further example embodiments of seat cushions according to the invention are shown in FIGS. 17 to 19. In these examples, rather than have the second cushion/support zone inserted into a cavity formed in the base of the first cushion, the second cushion/support zone is inserted into the rear wall of the first cushion/buffer zone. This provides that, the second cushion/support zone may be interchanged when the chair/seat (into which second cushion/support zone is incorporated) is fully assembled.

For example, FIG. 17 shows a rear view of a seat cushion 1700, having a second cushion/support zone 1714 fully inserted within a first cushion/buffer zone 1712. As shown, whilst the second cushion still has a substantially trapezoidal cross section, the rear portion 1713 thereof does not include a sloped/tapered peripheral portion. Rather the rear portion 1713 thereof is shaped to align substantially flush with the rear surface 1715 of the first cushion 1712. The remaining periphery regions 1716 are, however, still sloped/tapered, as per the embodiments of FIGS. 5 to 15, so as to provide the beneficial effects of the invention as described above.

FIG. 18 shows a rear underside perspective view of a slightly modified version of the seat cushion of FIG. 17. In FIG. 18, the cavity that receives the second cushion 1814 is not open/exposed at the underside of the first cushion 1812. Rather, the second cushion 1814 forms a tongue to be received in a slot of the first cushion 1814. FIG. 19 on the other hand, illustrates an embodiment wherein the cavity for the receiving the first cushion 1912 is substantially open/exposed at the underside. As shown in FIG. 19, the second cushion 1914 is slidingly received with the first cushion 1912. In the embodiment of FIG. 19, the periphery regions 1916 engage with corresponding grooves in the first cushion to substantially prohibit release therefrom by means other than out through the rear of the first cushion 1912.

It will be appreciated that in the forms as shown in FIGS. 17 to 19, the rear portions of second cushions (e.g. 1714, 1814, 1914) are shaped to be substantially flush with the rear surface of the first cushion (e.g. 1712, 1812, 1912), rather than being sloped/ramped.

It will be readily appreciated that the seat cushions as described herein may be used in the office, factory or aged care environments. The seat cushions may also be applied to lounge and dining seating, wheelchairs, car and truck seats. The seat cushions as described herein may also be retrofitted to an existing structure of a seat or chair. Alternatively, the seat cushions may be in a portable cushion form for using on existing seating surfaces.

It will also be appreciated that the first and second cushions (or support and buffer zones) may be formed of any suitable cushioning/support material (i.e. materials other than foam, such as, for example, gel, rubber or polymer based materials).

Figure 20:
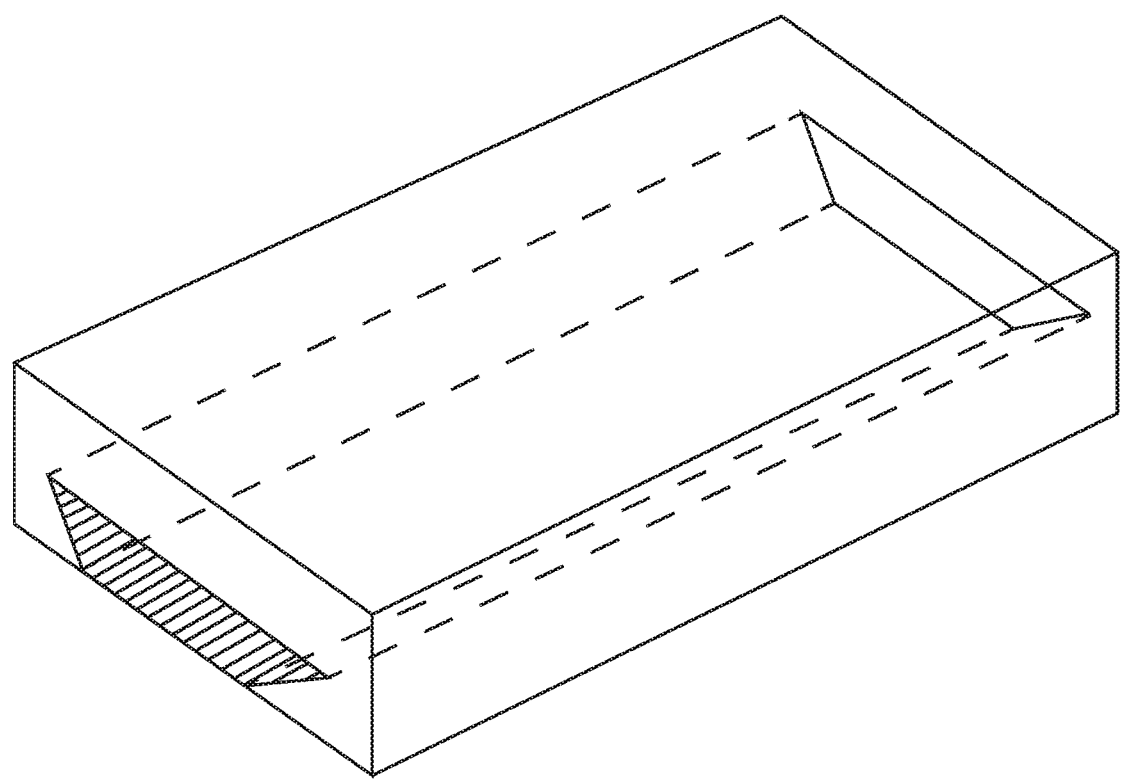
FIG. 20 shows a perspective view of a mattress having an internal support system according to one example of the invention.

Whilst the above described forms of the invention are embodied as seat cushions, typically for use in office chairs or the like, it will be appreciated that other forms may be embodied more generally for other supportive type furniture, such as, for example, bed mattresses (see for example FIG. 20). Broadly speaking, the invention may be described as an internal support system for cushions, mattresses or the like, that are generally used for supporting the body of a user. The internal support system generally including a main portion and a support portion located at least partly within the main portion. Typically, the support portion is more resistant to deformation/compression than the main portion (although in alternate forms the opposite may be true), and the proportions of support portion and main portion vary laterally through the internal support system to provide a varying support profile.

For example, an internal support system (e.g. embodied in a cushion or mattress etc.) may have a main portion with a body facing side substantially opposing a base side. A support portion may be located at least party within the main portion, that includes a core portion and at least one peripheral portion which extends laterally therefrom. The height of the core portion may be greater than the height of the at least one peripheral portion so as to provide the varying support profile (the height being that as determined in the direction from the base side to the body facing side of the main portion). Generally, the support portion is more resistant to compression/deformation than the main portion, and may be removably located therein.

It will be appreciated that the shape of the support portion may affect the support/cushioning profile. In one example, the support portion may include a base surface and a top surface, the base and top surfaces being substantially parallel in the core portion, and, at least a portion of the base surface sloping toward the top surface to provide the one or more peripheral portions.

Location of the support portion within the main portion may vary too, and may impact the support/cushioning profile. Generally, at least part of the core portion forms part of a base periphery of the internal support system. The support portion may also be located such that part of the main portion separates the support portion and the body facing side of the main portion. Part of the main portion may also separate the at least one peripheral portion from the base side of the main portion.

The peripheral portion(s) of the support portions too may take a variety of forms, but are typically tapered or ramped, such that the height thereof gradually reduces in the outward lateral direction. As the height reduces, a larger proportion of the support/cushioning profile of the internal support system is provided by the main portion. As such, it will be appreciated that in some forms, the area of the peripheral portions may have graded support profile.

It will also be appreciated that by altering the material selected for the main and support portions, the support/cushioning profile can be varied. For example, materials of varying compressibility, resilience, hardness, stiffness etc. may be selected to vary the support/cushioning profile. In one example, the materials selected are foam rubber materials or have foam rubber like properties i.e. are resiliently deformable/compressible so as to provide cushioning.

It is thus apparent that the internal support system as described herein may be used to address adverse effects on the body at high pressure areas created during extended sitting or lying (e.g. at the trochanters, iscial tuberosities and pelvis).

In this specification, terms denoting direction, such as vertical, up, down, left, right etc. or rotation, should be taken to refer to the directions or rotations relative to the corresponding drawing rather than to absolute directions or rotations unless the context require otherwise.

Although the invention has been herein shown and described in what is conceived to be the most practical and preferred embodiments, it is recognized that departures can be made within the scope of the invention, which are not to be limited to the details described herein but are to be accorded the full scope of the appended claims so as to embrace any and all equivalent assemblies, devices, apparatus, articles, compositions, methods, processes and techniques.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise, comprised and comprises" where they appear.

It will further be understood that any reference herein to known prior art does not, unless the contrary indication appears, constitute an admission that such prior art is commonly known by those skilled in the art to which the invention relates.

The invention claimed is:

1. A seat cushion for an office chair or the like, the seat cushion including:

a main portion having a front, rear, and lateral sides; and a support portion at least partly within the main portion such that it is centrally located between the lateral sides of the main portion, the support portion being more resistant to deformation than the main portion and including:

a core portion of substantially uniform vertical thickness that is centrally located between the lateral sides of the main portion and which extends towards the lateral sides of the main portion to a width for supporting the ischial tuberosities of a user;

lateral peripheral portions which extend laterally from the core portion toward the lateral sides of the main portion, the lateral peripheral portions tapering in vertical thickness from the core portion in a direction toward the lateral sides of the main portion; and a forward peripheral portion which extends forwardly from the core portion toward the front side of the main portion, the forward peripheral portion tapering in vertical thickness from the core portion in the direction toward the front side of the main portion, wherein the support portion includes a top surface and a base surface substantially parallel thereto, the top surface having a greater area than the base surface such that it extends beyond the base surface at the forward and lateral peripheral portions, and, at each of the forward and lateral peripheral portions, a sloping wall extends from the base surface to meet the top surface, and wherein the sloping wall at the forward peripheral portion slopes at a steeper angle to meet the top surface than the sloping walls at the lateral peripheral portions.

2. A seat cushion as claimed in claim 1, wherein the forward peripheral portion and the lateral peripheral portions taper respectively to front and lateral ends of the support portion, the front end extending between and substantially orthogonal to the lateral ends, which are substantially parallel to one another.

3. A seat cushion as claimed in claim 1, wherein the core portion has front, rear and lateral peripheries, the front periphery of the core portion extending between and substantially orthogonal to the lateral peripheries, which are substantially parallel to one another.

4. A seat cushion as claimed in claim 1, wherein the support portion is removably located within a recess in the main portion, the recess configured to fit the support portion.

5. A seat cushion as claimed in claim 4, wherein the support portion is slidingly received into the recess through an opening in the rear side of the main portion.

6. A seat cushion as claimed in claim 1, wherein the support portion has a substantially trapezoidal cross section in the plane transverse to a direction from the rear to the front of the main portion.

7. A seat cushion as claimed in claim 1, wherein the main portion is formed of a first foam material and the support portion is formed of a second foam material.

8. An office chair including a seat cushion as claimed in claim 1.

* * * * *